Sept. 18, 1962  R. W. COURSEY  3,054,518
SYSTEM FOR TRANSFERRING AUTOMOBILES AND THE LIKE
TO AND FROM STORAGE CARRIAGES
Filed Dec. 3, 1959  3 Sheets-Sheet 1

R. W. Coursey
INVENTOR.
BY Jerry J. Dunlap
ATTORNEY

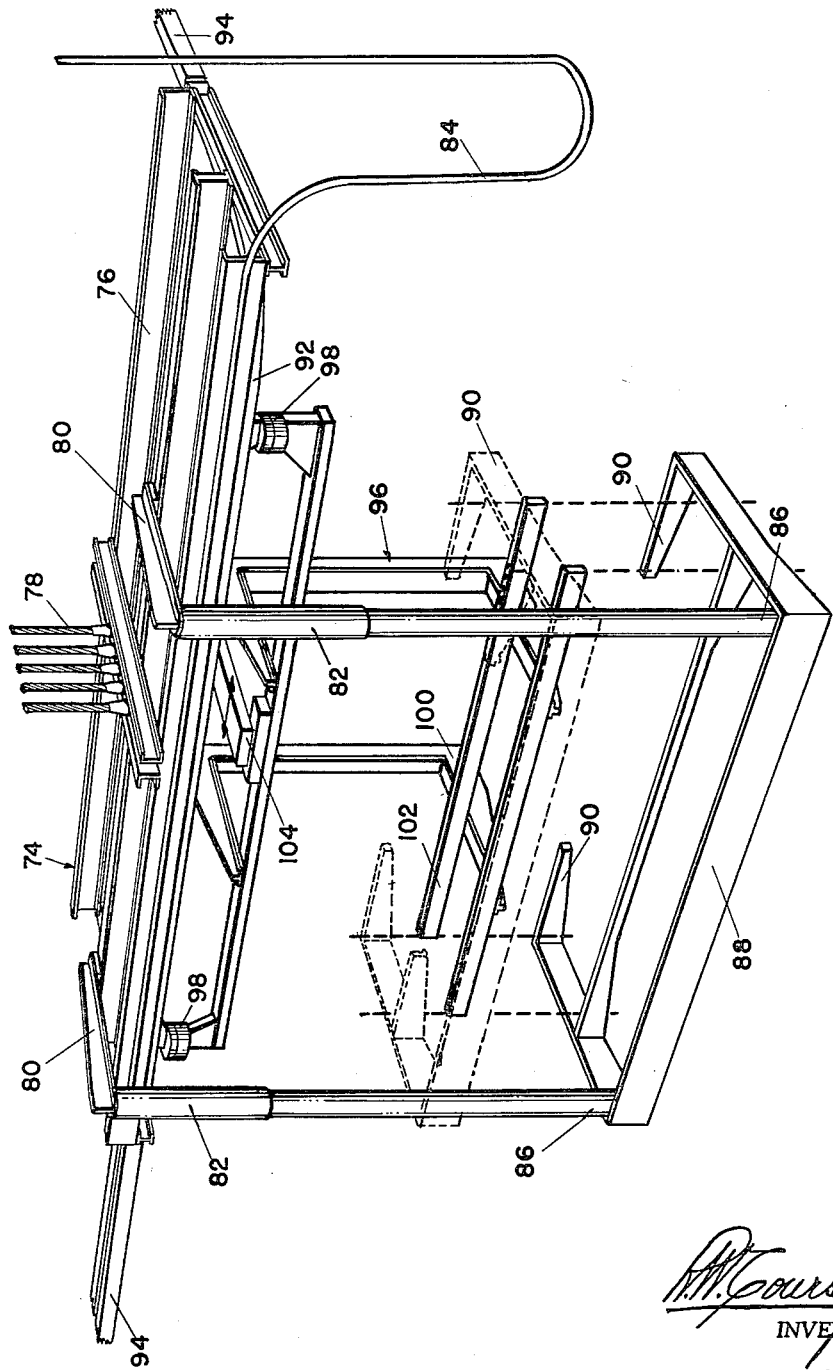

R W COURSEY
INVENTOR.

United States Patent Office 3,054,518
Patented Sept. 18, 1962

3,054,518
SYSTEM FOR TRANSFERRING AUTOMOBILES AND THE LIKE TO AND FROM STORAGE CARRIAGES
Ralph W. Coursey, 1414 E. Wilshire Blvd., Oklahoma City, Okla.
Filed Dec. 3, 1959, Ser. No. 857,029
8 Claims. (Cl. 214—16.1)

This invention relates generally to improvements in mass storage systems, and more particularly, but not by way of limitation, to an improved system for transferring automobiles from an elevator to a storage carriage, and vice versa, in a mass parking system.

My co-pending application entitled "Mass Storage System," Ser. No. 739,386, filed June 2, 1958, now Patent No. 2,916,168, describes and claims a storage system particularly adapted for the mass storage of automobiles, wherein automobiles are stored in a series of superimposed loop patterns in such a manner that the maximum number of automobiles may be stored or parked in a given space. However, in the system described in the above mentioned co-pending application, as well as in other automatic or semi-automatic parking systems, the automobiles are stored in carriages from the time the atuomobiles are first moved from a parking station toward their storage locations until the automobiles are returned to an unparking station. As a result, a substantial number of movements are required to replace the empty carriages in their parking positions when a second automobile is to be unparked prior to the receipt of an automobile requiring parking. These movements of empty carriages require substantial control systems and result in loss of time in a parking operation.

The present invention contemplates a novel parking system wherein the automobile storage carriages remain at one or more elevated levels and an automobile being parked or unparked is transferred directly between an elevator and a storage carriage at an elevated level. In the present system, an automobile being parked is simply raised by an elevator mechanism to a selected storage level and is then transferred into a storage carriage at the selected level; whereupon the elevator is free to either unpark an automobile from another storage carriage at an elevated level or return to a parking and unparking station for receipt of another automobile to be parked. As a result, the minimum movements of the elevator are required, and the controls necessary to handle the storage carriages at the elevated levels are reduced to a minimum.

Broadly stated, the present invention may be defined as the combination of an elevator movable to and from an elevated level, a vertically extending C-shaped carrier member on the elevator having horizontally extending fingers on the lower end thereof arranged in horizontally spaced relation and in positions to support an automobile in the carrier member, a carriage member having horizontally extending fingers thereon arranged in horizontally spaced relation and in positions to support an automobile thereon, means for moving the carriage member through the elevator carrier member at said level with the fingers of the carriage member out of alignment with the fingers of the elevator carrier member when the carriage member is at one position in the elevator carrier member, and means for raising and lowering the fingers of one of said members between the fingers of the other member for transferring an automobile from the carriage member to the elevator carrier member and vice versa.

An important object of this invention is to simplify mass storage systems. More specifically, it is an object of this invention to eliminate the necessity of moving storage carriages to and from elevated levels in a mass storage system.

Another object of this invention is to minimize the time required for parking and unparking automobiles in a mass parking system.

A further object of this invention is to provide the maximum safety in the transfer of an automobile or the like from an elevator to a storage position at an elevated level.

Another object of this invention is to provide a novel elevator construction for a mass parking system; whereby automobiles may be transferred directly from the elevator to a storage carriage at an elevated level in a minimum of time and in a simple operation.

A still further object of this invention is to provide a mass storage system which is simple in construction, may be economically manufactured and which will have a long service life.

Other objects and advantages of the invention will be evident from the following detailed description, when read in conjunction with the accompanying drawings, which illustrate my invention.

In the drawings:
FIGURE 1 is a partially schematic perspective view of an elevator and storage carriage construction illustrating a preferred embodiment of this invention.

FIGURE 2 is a view (similar to FIG. 1) of a modified elevator and storage carrier construction illustrating, in dashed lines, the action of the elevator in placing an automobile on or removing an automobile from a storage carriage.

Figure 1:
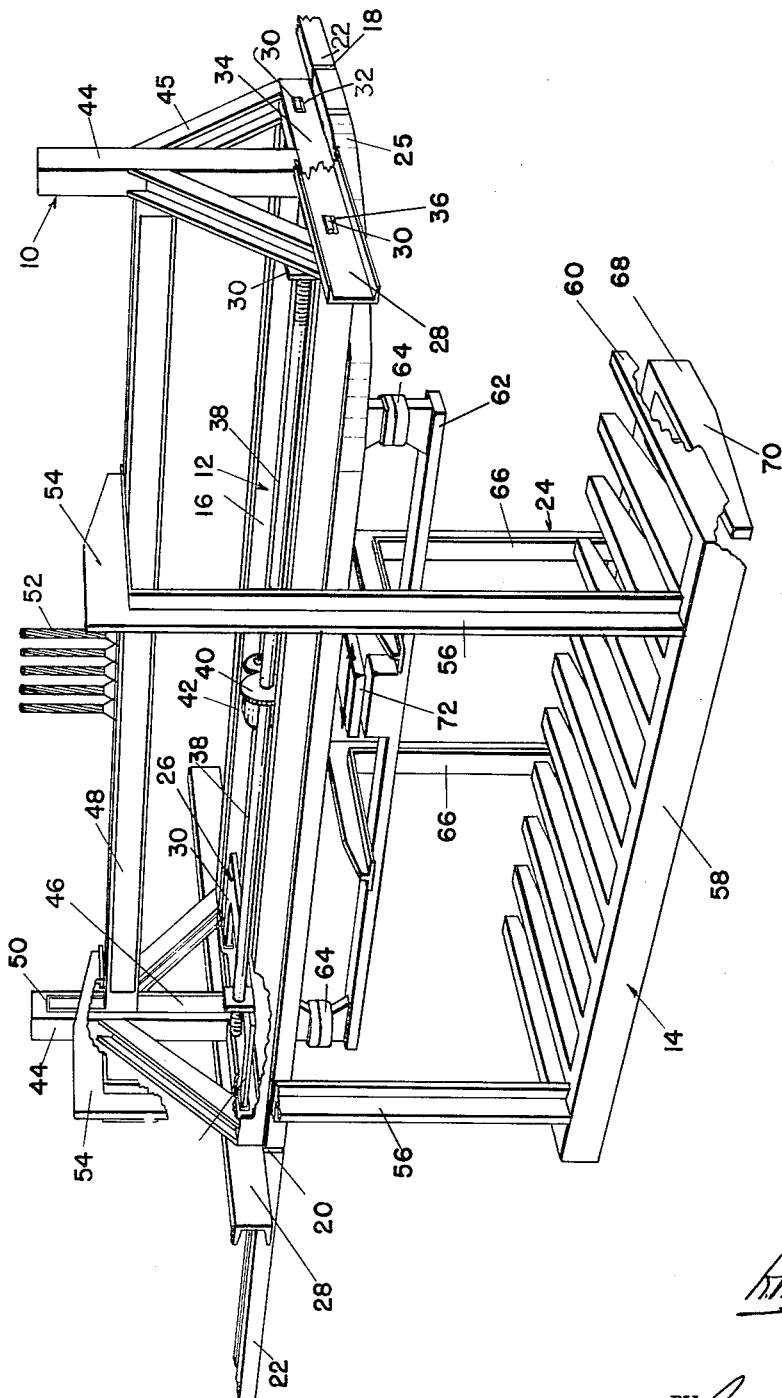
FIGURE 1A is a typical plan view of one end portion of a track system at an elevated level and adapted to utilize the elevator and carriage construction of this invention.
Figure 1A:
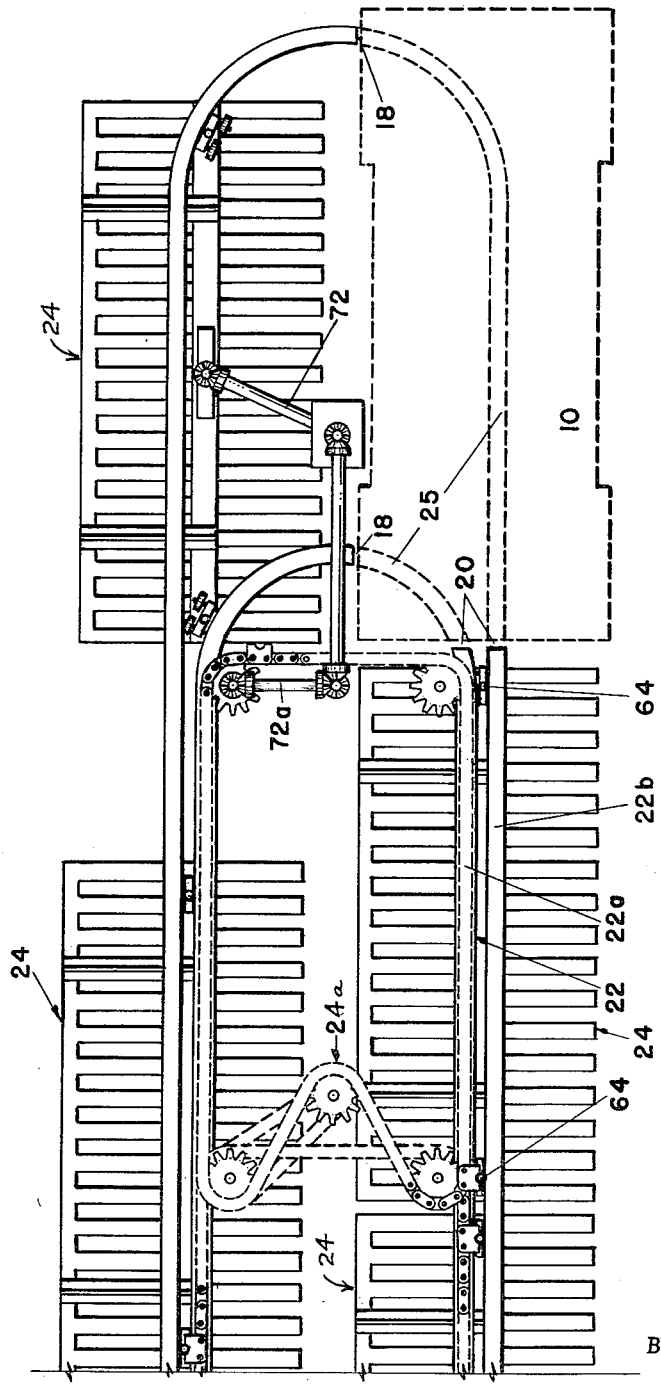

Referring to the drawings in detail, and particularly FIG. 1, reference character 10 generally designates a novel elevator construction, generally comprising a platform section 12 and a carrier section 14. The platform section 12 comprises a plurality of beams 16 suitably interconnected in a substantially rectangular configuration and being of a size to move between the adjacent ends 18 and 20 of an interrupted horizontally extending track 22. The track 22 preferably comprises a pair of track members 22a and 22b arranged in concentric loops as partially illustrated in FIG. 1A for supporting a plurality of automobile storage carriages 24 therefrom in the same manner as in my U.S. Patent No. 2,916,168. In a commercial embodiment, several of the track loops are provided in vertically spaced relation, and each track loop is interrupted at 18 and 20 as shown in FIG. 1A to form a shaft for the elevator 10. Each carriage 24 is suspended from its respective track 22 (as will be described) and is moved around the track 22 by a chain drive system 24a for moving an automobile thereon in and out of the elevator shaft.

A track section 25 is suitably secured on the lower face of the platform section 12 and is of a size and configuration to mate with the adjacent ends 18 and 20 of the horizontal track 22 when the elevator 10 is at the elevated level of the track 22. In order to align the elevator track section 25 with the horizontal track 22, and support the platform section 12 at the elevated level, I provide (see FIG. 1) a suitable latch mechanism 26 at each end of the platform section 12 which may be engaged with support beams 28 or the like of the track 22 when the track section 25 is aligned with the adjacent ends 18 and 20 of the track 22. The latch 26 may be of any desired construction, such as a C-shaped member 30 at each of the opposite ends of the platform section 12 adapted to extend through apertures 32 in the end members 34 of the platform section 12 and through mating apertures 36 in the track supporting beams 28. Each C-shaped latch member 30 is threadedly mounted on the outer end of a control shaft 38 driven through suitable gearing 40 from a control motor 42.

As will be readily understood by those skilled in the art, the latches 30 may be retracted or moved outwardly from the opposite ends of the platform section 12 upon rotation of the control shaft 38 by operation of the control motor 42.

A vertically extending post 44 is secured to each of the opposite ends of the platform section 12 by suitable braces 45, with the posts 44 being aligned with each other, and preferably being aligned with the longitudinal centerline of the platform section 12. Slots 46 are formed in the adjacent faces of the vertical posts 44 to slidingly receive the opposite ends of a lifting bar or beam 48 positioned above the platform section 12. The lower ends of the slots 46 terminate with the end members 34 of the platform section 12, and the upper ends 50 of the slots 46 are closed to limit the vertical movement of the lifting bar 48 with respect to the platform section 12. The usual elevator cables 52 are suitably connected to the lifting bar 48 for raising and lowering the carriage 10 and operating the elevator carrier section 14, as will be described in detail below.

The carrier section 14 comprises a pair of top bars 54 secured to the lifting bar 48 and extending outwardly over one side of the platform section 12. Suitable side members or bars 56 are connected to the outer ends of the top bars 54 and extend downwardly alongside the platform section 12. A foot member 58 is suitably secured to the lower ends of the side bars 56 and extends horizontally underneath the platform section 12. It may also be noted that the foot member 58 comprises a plurality of horizontally extending fingers 60 arranged in horizontally spaced relation to support an automobile (not shown) on the carrier section 14. In this embodiment of the invention, the fingers 60 extend transversely with respect to an automobile supported on the foot member 58, such that the fingers 60 will engage the wheels of the automobile and will hold the automobile in a fixed position on the carrier 14. It will therefore be apparent that the carrier section 14 of the elevator 10 is substantially C-shaped, and the fingers 60 thereof will be moved vertically upon vertical movement of the lifting bar 48 of the elevator.

In a preferred construction, a typical storage carriage 24 comprises an elongated beam 62 having suitable roller assemblies 64 at the opposite ends thereof for suspending the carriage 24 from the track 22 or from the track section 25. It may also be noted that the length of the beam 62 is less than the distance between the adjacent ends 18 and 20 of the horizontally extending track 22, such that the carriage 24 will be completely supported by the elevator 10 when the carriage is directly underneath the elevator as illustrated in FIG. 1. Thus, the carriage 24 may be moved by the elevator 10 to another storage level, or to the ground for repair or the like, if desired.

A pair of L-shaped support members 66 are secured in spaced relation to the beam 62 and extend outwardly and downwardly from the beam 62 for supporting a foot member 68 directly underneath the beam 62. Thus, the carriage 24 is also C-shaped in cross-section. The foot member 68 is constructed in substantially the same manner as the foot member 58 of the elevator carrier section 14 and is provided with a plurality of horizontally extending and horizontally spaced fingers 70 arranged to support an automobile thereon. It may also be noted here that the fingers 70 are spaced from one another, and with respect to the spacing of the fingers 60 of the elevator carrier section 14 in such a manner that the fingers 60 may be moved vertically between the fingers 70 when an automobile is being transfered to or from the elevator carrier 14, as will be described below.

The carriage 24 may be moved along the horizontally extending track section 22 by the chain drive system 24a engaging the roller assemblies 64 and around the end of the track loop, including track section 25 by any suitable means, such as a turning arm 72 having a drive system 72a. The turning arm 72 may be connected to the carriage 24 in any desired manner, such as shown in the above mentioned patent, it merely being required that the arm 72 be capable of moving the carriage 24 around the end of the track loop, including the track section 25 when the elevator 10 is in the position shown in FIG. 1.

Operation

In use of the elevator 10 for parking an automobile, the elevator 10 is first lowered to a parking station and the automobile is placed on the fingers 60 of the elevator carrier section 14 in any desired manner, such as by moving the fingers 60 below the floor level at the parking station and driving the automobile onto the foot member 58. In any event, the wheels of the automobile will be arranged between adjacent fingers 60, such that the automobile will be securely in place on the carrier section 14 of the elevator 10. The elevator 10 is then raised to a storage level, as illustrated in FIG. 1. It may be noted here that when the elevator cables 52 are placed under tension to raise the elevator 10, the opposite ends of the lifting bar 48 will contact the upper closed ends 50 of the slots 46, such that the lifting bar 48 will, in turn, raise the platform section 12, and the entire elevator construction will move as a unit to the desired storage level.

When the elevator 10 is raised to the position shown in FIG. 1, the control motor 42 is actuated to move the latching members 30 through the end members 34 and the track-supporting members 28; whereupon the track section 25 of the elevator will be locked in alignment with the adjacent ends 18 and 20 of the horizontally extending track 22. The carriage 24 is then moved to a position where it is suspended from the track section 25, as illustrated in FIG. 1. The control arm 72 is operated until the fingers 70 of the carriage 24 are out of alignment with the fingers 60 of the elevator carrier section 14. It should also be noted that the lengths of the side bars 56 of the elevator carrier section 14, and the lengths of the support members 66 of the carriage 24 are such that the fingers 70 will be positioned below the fingers 60 when the opposite ends of the elevator lifting bar 48 are at the upper ends 50 of the slots 46. Therefore, the carriage 24 may be moved to the position shown in FIG. 1 with the fingers 70 thereof directly below the automobile stored on the elevator carrier section 14, without interference with the automobile in any respect.

With the storage carriage 24 in the position shown in FIG. 1, and with the latch mechanism 26 engaged with the track-supporting beams 28, the elevator cables 52 are slackened to lower the lifting arm 48 through the slots 46 and simultaneously lower the fingers 60 of the elevator carrier section 14 between the fingers 70 of the carriage 24. As the fingers 60 pass downwardly below the level of the fingers 70, an automobile supported on the fingers 60 will become supported on the fingers 70 and the automobile will be effectively transferred to the carriage 24. The downward movement of the fingers 60 is continued until the fingers 60 are completely below the fingers 70. This latter position of the fingers 60 occurs when the opposite ends of the lifting bar 48 are at the lower ends of the slots 46. The turning arm 72 is then again operated to move the storage carriage 24 lengthwise along the track section 25 and onto the horizontally extending track 22 away from the elevator 10. It will be understood that the automobile is then stored on the carriage 24 and is moved along the horizontal track 22 upon movement of the carriage 24.

When the carriage 24 has been moved from underneath the elevator platform section 12, the elevator cables 52 are again placed under tension to raise the lifting bar 48 until the opposite ends of the lifting bar are at the closed upper ends 50 of the slots 46. The latch mechanism 26 is then operated to retract the latch members 30 from the track-supporting beams 28 and the elevator 10 is then free to move either upwardly or downwardly. Therefore, the elevator 10 can be moved to a different storage level for unparking an automobile, or may be returned to the parking station for receipt of another automobile to be parked, depending upon the demands of the particular parking system in which the present invention is utilized.

In order to unpark an automobile by use of the elevator 10, the elevator is raised by means of the cables 52 to the desired parking level and the latch mechanism 26 is engaged with the respective track-supporting beam 28 to align the track section 25 with the horizontal track 22. The elevator cables 52 are then slackened to move the lifting bar 48 downwardly until the opposite ends of the lifting bar 48 are at the lower ends of the slots 46. It will then be recalled that the fingers 60 are below the level of the fingers 70 of a storage carriage 24 supported at the respective storage level.

The loaded carriage 24 is then moved onto the track section 25 until the fingers 70 thereof are out of alignment with the fingers 60 of the elevator carrier section 14. The elevator cables 52 are then placed under tension to raise the lifting bar 48 and move the fingers 60 upwardly between the horizontally spaced fingers 70 of the carriage 24; whereupon an automobile stored on the carriage 24 is transferred to the elevator carrier section 14. When the opposite ends of the lifting bar 48 are at the upper ends 50 of the slots 46, the fingers 60 of the elevator will be positioned above the fingers 70 of the carriage 24.

The carriage 24 is then moved back onto the horizontally extending track 22 away from the elevator 10. Upon unlatching of the latch mechanism 26, the elevator 10 may be lowered to an unparking station where the automobile may be easily removed from the elevator carrier section 14.

Referring now to the embodiment illustrated in FIG. 2, reference character 74 generally designates an elevator comprising a rectangularly shaped platform section 76 having the usual elevator cables 78 connected thereto for raising and lowering the elevator. A pair of top bars 80 are secured in spaced relation to the platform section 76 and extend outwardly beyond one side of the platform section. A hydraulic or pneumatic ram 82 is connected to the outer end of each top bar 80 and extends downwardly alongside the platform section 76. The rams 82 are connected to a fluid conduit 84 extending from suitable control equipment (not shown), whereby the rams 82 may be expanded or retracted in a conventional manner. The lower ends 86 of the rams 82 are connected to a foot member 88 extending underneath the platform section 76. The foot member 88 has suitable horizontally extending fingers 90 arranged in spaced relation to support an automobile thereon. In this embodiment of the invention, the fingers 90 are arranged in spaced relation in such a manner as to support an automobile by engaging the front and rear axle housings of the automobile, as will be readily understood by those skilled in the art. Therefore, the fingers 90 extend lengthwise with respect to an automobile (not shown) supported thereon.

A track section 92 is supported on the underface of the platform section 76 and is of a size to mate with adjacent sections of a horizintally extending track 94 in substantially the same manner as the track section 25 mating with the horizontally extending track 22 in the embodiment shown in FIG. 1 and previously described. The track 94 and track section 92 are constructed to support an automobile carriage 96 therefrom by means of suitable roller assemblies 98 connected to the opposite ends of the carriage 96. In this embodiment, the carriage 96 is also C-shaped in configuration and is provided with a horizontally extending foot member 100 having horizontally spaced fingers 102. The feet 102 extend parallel with the fingers 90 of the elevator carrier and are constructed in any suitable manner such that the fingers 90 may be moved vertically above or below the feet 102 without interference when the carriage 96 is properly positioned on the track section 92, as illustrated by the dashed line in FIG. 2.

In parking or storing an automobile with the embodiment illustrated in FIG. 2, the elevator 74 is lowered to a parking station (not shown) and an automobile is suitably placed on the fingers 90 in such a manner that the fingers 90 engage the axle housings of the automobile. The elevator 74 is then raised by placing the cable 78 under tension until the track section 92 is aligned with the horizontally extending track 94. Also, either prior to the raising of the elevator 74 or when the elevator 74 is at the level of the track 94, the rams 82 are retracted to raise the fingers 90 to the dashed line positions shown in FIG. 2.

With the elevator 74 in the position shown in FIG. 2 and with the fingers 90 in the dashed line positions illustrated in FIG. 2, the carriage 96 is moved to the track section 92 by any suitable drive mechanism, such as a turning arm 104 of the type shown in detail in the above mentioned co-pending application. The rams 82 are then extended to move the fingers 90 to the solid line positions shown in FIG. 2; whereupon an automobile supported on the fingers 90 will come to rest on the fingers 102 of the carriage 96 and the fingers 90 will be lowered completely below the fingers 102. The carriage 96 is then free to be moved back onto the horizontally extending track 94 without interference with any portion of the elevator 74; whereupon the elevator 74 is free for movement to another elevated storage level or back to the parking and unparking station.

In unparking an automobile with the system illustrated in FIG. 2, the elevator 74 is moved to a storage level with the track section 92 thereof aligned with the particular horizontally extending track 94 as illustrated in FIG. 2. Also, the rams 82 are extended to position the fingers 90 in the solid line positions illustrated in FIG. 2. A carriage 96 having an automobile stored thereon is then moved onto the track section 92 to the position shown in FIG. 2; whereupon the rams 82 are retracted to raise the fingers 90 to the dashed line positions shown in FIG. 2 and the automobile is transferred from the fingers 102 onto the fingers 90. The carriage 96 is then moved back onto the horizontally extending track 94 from under the elevator 74 and the elevator 74 may be lowered to an unparking station.

From the foregoing, it will be apparent that the present invention provides a highly simplified parking system. The storage carriages remain at the desired storage levels and automobiles are transferred directly from an elevator to a selected storage carriage and vice versa, such that the storage carriages are never moved by the elevator. The transfer of automobiles or the like directly between an elevator and a storage carriage is carried out efficiently and safely in a minimum of time, and when an automobile is removed from the elevator, the elevator may be moved directly to another storage level to unpark another automobile, or the elevator may be moved directly to a parking station for receiving another automobile to be parked. It will be further apparent that the present invention requires the minimum controls for parking and unparking automobiles or the like and that the present system is simple in construction, may be economically manufactured and will have a long service life.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:

1. in a system for storing automobiles or the like, wherein the automobiles are stored at an elevated level, the combination of: means forming an elevator shaft extending vertically through said level, an elevator movable through the elevator shaft to and from the elevated level, a vertically extending C-shaped carrier member on the elevator having horizontally extending fingers on the lower end thereon arranged in horizontally spaced relation and in positions to support an automobile in the carrier member, a carriage member having horizontally extending fingers thereon arranged in horizontally spaced relation and in positions to support an automobile thereon, means for moving the carriage member horizontally through the elevator shaft and the elevator carrier member at said level and for positioning the carriage member in the elevator shaft in a position with the fingers of the carriage member out of alignment with the fingers of the elevator carrier member, and means for raising and lowering the fingers of said carrier member between the fingers of said carriage member in said position of the carriage member for transferring an automobile from the carriage member to the elevator carrier member and vice versa within the elevator shaft.

2. A system as defined in claim 1 wherein the fingers of the elevator carrier member and the fingers of the carriage member each extend transversely with respect to an automobile stored thereon to engage the wheels of the automobile.

3. A system as defined in claim 1 wherein said means for raising and lowering the fingers of said carrier member comprises at least one ram connected to the elevator and the elevator carrier member fingers for raising and lowering the fingers of the elevator carrier member.

4. A system as defined in claim 1 wherein the carriage member is an elongated, box-shaped structure, C-shaped in cross section for movement lengthwise through the elevator carrier member.

5. A system as defined in claim 4 wherein the fingers of the elevator carrier member and the fingers of the carriage member each extend lengthwise with respect to an automobile stored thereon to engage the axle housings of the automobile.

6. In a system for storing automobiles or the like wherein the automobiles are stored at an elevated level, the combination of: horizontally extending track means at said elevated level having an elevator gap therein, a C-shaped carriage movably suspended from the track means and having horizontally extending fingers on the lower end portion thereof arranged in spaced relation to support an automobile thereon, said carriage member forming an elongated and box-shaped structure, an elevator movable through said gap and having a track section thereon of a size to mate with said horizontally extending track means when the elevator is positioned at said elevated level, a top bar secured to the elevator and extending outwardly from one side of the elevator, at least one ram connected to said top bar and extending downwardly therefrom alongside the elevator, and a foot member connected to the lower end of said ram and extending horizontally under the elevator, said foot member having a plurality of fingers thereon extending in horizontally spaced relation to support an automobile thereon, means for moving the carriage onto and off of the elevator track section across the elevator over said foot member when the elevator is at said elevated level, and means for actuating said ram for moving the fingers of the elevator vertically through the fingers of the carriage to transfer an automobile from the carriage to the elevator and vice versa.

7. In a system for storing automobiles or the like wherein the automobiles are stored at an elevated level, the combination of: horizontally extending track means at said elevated level having an elevator gap therein, a C-shaped carriage movably suspended from the track means and having horizontally extending fingers on the lower portion thereof arranged in spaced relation to support an automobile thereon, an elevator movable through said gap and having a track section thereon of a size to mate with said horizontally extending track means when the elevator is positioned at said elevated level, said elevator comprising a platform section having the track section thereon, latch means carried by the platform section for engaging said track means and locking the elevator track section in alignment with said track means, a lifting bar slidingly carried by the platform section for limited vertical movement independent of the platform section, an elevator drive system connected to said lifting bar, a plurality of top bars connected to said lifting bar and extending outwardly over one side of said platform section, side bars extending downwardly from said top bars along said one side of said platform section, horizontally extending fingers secured to the lower ends of said side bars underneath said platform section in horizontally spaced relation to support an automobile thereon, and means for moving the carriage onto and off of the elevator track section, said fingers on said carriage and said elevator being sized and arranged for vertical movement of the elevator fingers through the carriage fingers when said platform section is latched to said track means, the carriage is supported from the elevator track section and said lifting bar is moved vertically by the elevator drive system, for transferring an automobile from the elevator to the carriage and vice versa.

8. A system as defined in claim 7 wherein said elevator platform section has a pair of posts thereon extending upwardly therefrom in horizontally spaced relation and said posts have aligned slots in the adjacent faces thereof to slidingly receive the opposite ends of said lifting bar and secure the lifting bar to the platform section.

References Cited in the file of this patent

UNITED STATES PATENTS

| | | |
|---|---|---|
| 2,014,351 | Becker | Sept. 10, 1935 |
| 2,316,976 | Sahlin | Apr. 20, 1943 |
| 2,858,032 | Morley | Oct. 28, 1958 |
| 2,916,168 | Coursey | Dec. 8, 1959 |
| 2,930,496 | Wheeler | Mar. 29, 1960 |